UNITED STATES PATENT OFFICE.

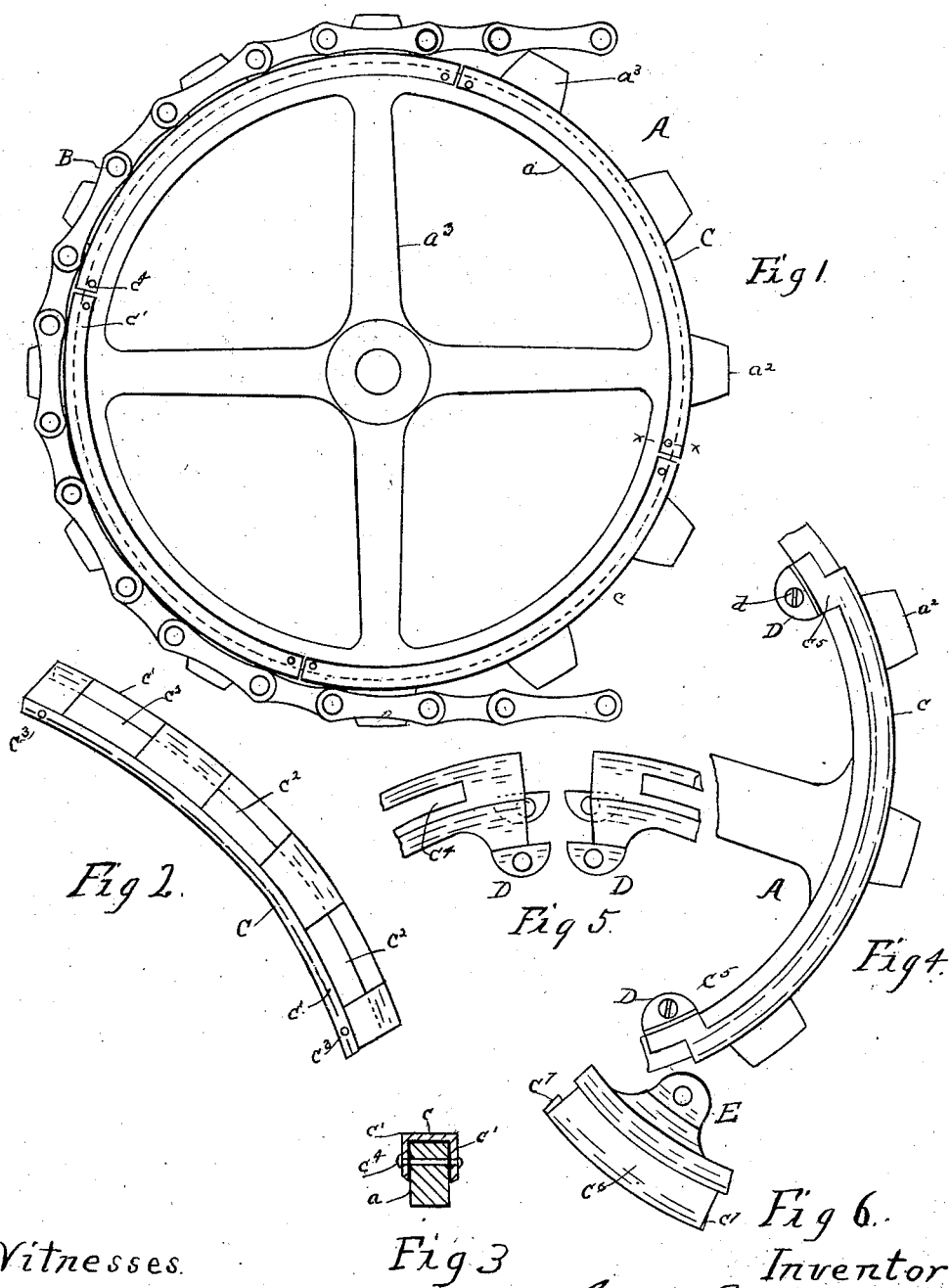

LEWIS REEDY, OF LAWRENCE, KANSAS.

SPROCKET-WHEEL FOR BICYCLES.

SPECIFICATION forming part of Letters Patent No. 699,240, dated May 6, 1902.

Application filed July 20, 1901. Serial No. 69,002. (No model.)

*To all whom it may concern:*

Be it known that I, LEWIS REEDY, a citizen of the United States of America, residing at Lawrence, in the county of Douglas and State of Kansas, have invented certain new and useful Improvements in Sprocket-Wheels for Bicycles; and I do hereby declare that the following is a full, clear, and exact description of the invention, such as will enable others to make and use the same, reference being had to the accompanying drawings, forming a part of this specification.

The object of my invention is to compensate for the wear and consequent lengthening of the sprocket-chain in sprocket-chain gearing and also to prevent warping of and impart rigidity to the compensating device and enable its application to be made upon the sprocket-wheels whose teeth are of varying width.

The invention consists in the novel construction and combination of parts, such as will be first fully described and then specifically pointed out in the claims.

In the drawings, Figure 1 is a side view of a sprocket-wheel, showing a portion of the chain-gearing and the novel compensating device upon the wheel. Fig. 2 is a detail view in perspective of one peripheral section of the compensating device. Fig. 3 is a transverse sectional view of the periphery of the sprocket-wheel and of the compensating device, taken upon the line $x\ x$ of Fig. 1. Fig. 4 is a view in perspective of a broken portion of the periphery of the sprocket-wheel, showing the compensating device and alternate means of securing the device to the wheel. Fig. 5 is a detail view showing the ends of peripheral sections of the compensating device placed apart and showing the means for securing the device to the wheel as seen on Fig. 4. Fig. 6 is a view of a modified form of the compensating device, also showing a means of attachment similar to that shown in Fig. 4.

Similar letters of reference indicate corresponding parts in all the figures of the drawings.

Referring to the drawings, A represents a sprocket-wheel which is commonly employed in a bicycle, keyed to the crank-shaft, of which $a$ is the rim, $a^2$ the sprocket-teeth, and $a^3$ the spokes.

B represents the sprocket-chain or gearing for transmitting power from the wheel A.

C represents the novel compensating device, which consists of a narrow strip $c$, preferably of metal and of the requisite length to extend a portion of the distance upon the peripheral surface of the rim of the wheel, in which strip are a series of openings $c^2$ of the corresponding length and width of the sprocket-teeth $a^2$ and spaced the proper distance apart to admit of the entrance of a corresponding number of the teeth $a^2$ of the sprocket-wheel A.

The compensating strip $c$ is bent in a curved line to conform to the periphery of the rim $a$ of wheel A; the longitudinal sides of which strip are bent at right angles to form flanges $c'\ c'$, which are extended downwardly from the outer edges of the periphery of the rim $a$ of the wheel and upon the surface of both sides of said rim. In the opposite flanges $c'\ c'$ of the compensating strip $c$, and near the end of said strip, are small openings $c^3$, through which and the rim $a$ extend the pins or rivets $c^4\ c^4$, which hold the compensating strip firmly to the rim $a$ of the wheel. The openings $c^2$ in the compensating strip extend the width of rim $a$ of the wheel and accommodate the width of the sprocket-teeth $a^2$, the sides of which teeth are commonly in the plane of the surfaces of the rim. The flanges $c'\ c'$ of the compensator serve to impart rigidity to the plate $c$ and hold the parts of the compensator close to the periphery between the sprocket-teeth, and by means of which the attachment of the compensator to the wheel is readily effected and at a point convenient for security.

Instead of securing the novel compensator to the wheel as shown in Fig. 1, an alternate form of attachment is employed, as seen in Fig. 4, in which ear-plates D are employed. In this construction a portion of the flanges $c'\ c'$ at each end of the compensator is extended downwardly to the line of the inner edges of the rim $a$, as at $c^5$, and with the lower edges of said extensions are connected the ear-plates D D, the lower edges of which plates are formed in arcs of circles and extend at one end a short distance beyond the ends of the compensator. The ear-plates D D are perforated transversely, one of which perforations is screw-threaded, and a screw is passed through the perforations beneath the rim of the wheel A, which draws upon the ears and secures the compensator to the wheel. The openings $c^4$ in the compensator are shown narrow in width to receive a tooth of corresponding width. When separate compensators are employed upon wheel A, the ears D D upon adjacent ends of the compensators overlap, as seen in Fig. 5, and the said screw employed to secure the overlapping ears with each other, as in Fig. 4. I may also employ a short compensator $c^6$, as seen in Fig. 6, when desirable, to extend upon the periphery of the rim $a$, between contiguous teeth $a^2$ $a^2$, of the wheel, in which the flanges $c^7$ are projected in length a slight distance beyond that of the compensator. In this form of compensator a portion of the flanges $c^7$ extend downwardly to the inner edge of the rim $a$ of the wheel and the ear-plates E E, connected with said extensions intermediate the ends of the compensator and the separate ear-plates, secured as described of the ear-plates D D.

Whenever the chain gearing B becomes lengthened from use and longer than necessary, the block of the chain, instead of taking its place exactly between the teeth $a^2$ of the wheel A, strikes the tooth and grinds its way down to the periphery of the wheel, thereby causing an undue amount of friction, in which emergency one or more of the compensating plates are secured to the rim $a$ of the wheel, thus taking up the elongation of the chain-gearing B and effecting an exact engagement of the sprocket-chain and teeth, and the rotation of wheel A is unaccompanied with the irregularity and noise of the chain. As the impact of the blocks of the chain upon the compensator from the increased circumference is upon the parts of the compensator adjacent to contiguous teeth of the sprocket-wheel, the flanges $c'$ $c'$ afford rigidity to the compensator and prevent a lateral movement and also warping of the compensatory plate and adapting the compensator to a sprocket-wheel having a tooth narrow in width or equal in width to the rim of the wheel. As these compensators require usually an immediate application, the novel attachments afford ready means for securing the compensators in position to take up more or less of the chain, as may be required.

It is obvious that other modifications may be employed, such as are within the scope of the invention.

Having fully described my invention, what I now claim as new, and desire to secure by Letters Patent, is—

1. A compensating device for gear-wheels, comprising a peripheral compensating plate having openings spaced apart for the teeth of the wheel, and flanges securing the compensating plate to the wheel.

2. A compensating device for gear-wheels comprising a peripheral compensating plate, having openings spaced apart for the teeth of said wheel, flanges extending downwardly from the compensating plate upon the opposite surface of the rim of said wheel, and means for securing said flanges to said wheel.

3. A compensating device for gear-wheels comprising a compensating plate upon the periphery of the wheel and ear attachments therefor on the inner side of the rim of said wheel.

4. A compensating device for gear-wheels comprising a compensating plate having openings spaced apart for the teeth of said wheel, and flanges upon each side of said compensating plate extending downwardly upon opposite surfaces of the rim of said wheel, and ear-plates upon said flanges and means for securing said ear-plates to each other.

5. A compensating device for gear-wheels comprising a compensating plate having openings spaced apart for the teeth of said wheel, flanges upon each side of said compensating plates, extending downwardly upon the opposite surfaces of the rim of said wheel, and ear-plates connected with said flanges, and extending beyond the end of said compensating plates, and a securing device for said ears.

In testimony whereof I have signed my name to this specification in the presence of two subscribing witnesses.

LEWIS REEDY.

Witnesses:
C. E. LINDLEY,
F. M. McHALE.